United States Patent [19]

Curtiss

[11] Patent Number: 4,483,236
[45] Date of Patent: Nov. 20, 1984

[54] PNEUMATIC THROTTLE CONTROL

[75] Inventor: George R. Curtiss, Chardon, Ohio

[73] Assignee: The Rotor Tool Company, Cleveland, Ohio

[21] Appl. No.: 228,335

[22] Filed: Jan. 26, 1981

[51] Int. Cl.³ .............................................. F01B 25/26
[52] U.S. Cl. ............................................... 91/1; 91/59;
91/447; 91/458; 91/520
[58] Field of Search ........................ 91/59, 426, 1, 520,
91/458, 366, 447; 137/624.27, DIG. 7; 251/14

[56] References Cited

U.S. PATENT DOCUMENTS 3,904,305  9/1975  Boyd ........................................ 137/58
4,243,111  1/1981  Willoughby ............................. 91/59
4,263,938  4/1981  Peters ................................ 137/624.27

Primary Examiner—Abraham Hershkovitz
Attorney, Agent, or Firm—Maky, Renner, Otto & Boisselle

[57] ABSTRACT

A pneumatic throttle control configuration provides synchronized start-up and independent shut-off of multiple pneumatic tools. Each tool includes a throttle control assembly having a manually operable throttle valve which selectively admits air to the vane motor of the tool and a spring-biased piston operably coupled to the throttle valve which maintains it in an open position in response to air pressure in a control line which interconnects the tools. The vane motor includes a governor controlled valve which opens at a predetermined motor speed and provides air to the control line and the pistons of each tool of the multiple tool arrangement, thereby opening every throttle valve. Each pneumatic tool may then operate and stall independently. When the last tool stalls, the control air flow to all tools is terminated and the throttle valves close.

15 Claims, 7 Drawing Figures

PNEUMATIC THROTTLE CONTROL

BACKGROUND OF THE INVENTION

The invention relates generally to pneumatic tool controls and more particularly to pneumatic tool throttle controls for use with multiple, fixtured motors.

It is common production line practice to utilize a plurality of assembly tools such as pneumatic tools to tighten a like plurality of fasteners disposed in an array. For example, the four or five bolts which are utilized to fasten a motor vehicle wheel to a hub are arranged in an array such that a like number of pneumatic tools arranged in a similar array may be utilized to expeditiously tighten the nuts simultaneously. The pneumatic tools are secured to a fixture such as a flat plate which maintains their appropriate spatial interrelationship and permits the handling and positioning of the tools as a unit.

In the prior art, it was common practice to utilize a plurality of independently operating tools. Typically such tools incorporate a one-shot operating sequence, i.e., operation is commenced by activation of a control or the application of air pressure and the tools operate as long as either the control is activated and air pressure is maintained or until the tool motor stalls and shuts off. At this time, the control or air pressure must be released in order for the tool to reset and begin a new operating cycle. During tightening down of the fasteners in a typical operating cycle, it is clear that one fastener will be secured and the associated pneumatic tool will stall first, followed sequentially by tightening and stall of the remaining fasteners and tools. Returning to the vehicle wheel and hub example, it should also be clear that if the wheel is not tightly seated on the hub when the first fastener is tightened down and the motor stalls, subsequent tightening of the remaining fasteners may cause loosening of the first fastener. Should the dimensional shift between the components be several thousandths of an inch, the first fastener may ultimately be loose and free upon the wheel hub lug. Since the tool associated with this loose fastener has stalled and completed its one-shot operating sequence, the fastener will not be properly tightened. Such operation is manifestly unsatisfactory and has prompted other design approaches.

A further difficulty of both single and multiple fixtured pneumatic tools relates to failure to complete the operating cycle. In typical pneumatic tools, the throttle is a springbiased lever which the operator depresses to activate the tool and releases subsequent to the tightening down of the fastener which is typically manifested by stalling of the drive motor. For various reasons such as haste or inattention, it has been found that an operator may release the throttle lever prior to motor stall and leave the fastener torqued at some arbitrary, incorrect and deficient value. Typically, such occurrences are random, making them especially difficult and expensive to locate and correct.

One suggested response to these difficulties comprehends the use of air logic circuits which utilize signals from each motor to determine torque application and the ultimate stall conditions. Such logic circuitry tends to be not only expensive, but vulnerable to tampering and misadjustment.

SUMMARY OF THE INVENTION

The invention comprehends a pneumatic tool throttle control which provides synchronous start-up and independent shut-off of multiple, fixtured tools. The control configuration maintains air to the stalled tools until all have completed the fastening operation and stalled in order to ensure accurate torque application to even the first-tightened fastener. Each tool is supplied with compressed air and is interconnected with all the tools on the fixture by a control air circuit. The throttle control assembly includes a throttle valve which is spring biased toward a closed position and which selectively admits air to the air motor of the pneumatic tool. Also included in the throttle control assembly, and operatively disposed on the same stem with the throttle valve, but in an independent air passageway, is a piston which translates the stem and throttle valve and maintains it in an open position in response to air pressure in the control air circuit. The air motor of the pneumatic tool includes a governor controlled valve which opens when the motor reaches a predetermined speed and provides a flow of compressed air to the piston of the throttle control assembly of the instant tool as well as the control pistons of all the interconnected tools. The control air thus opens every throttle valve and the tools commence operation. Each tool will complete its fastening operation and stall independently. When but a single tool motor remains operating, the governor controlled valve therewithin is the only means by which compressed air may enter the control circuit and maintain the activation of the control pistons and throttle valves. Thus, when the last of the multiple fixtured tools stalls, the governor controlled valve closes, the pressure within the control circuit falls and all the throttle valves close. Prior to stall of the last tool, however, any tool which has stalled may restart if the fastener associated therewith has loosened as the others are being tightened.

An alternate embodiment of this throttle control configuration provides improved performance to single, hand-held pneumatic power tools. This embodiment incorporates the same throttle control assembly having the throttle valve and control piston positioned within independent air passageways. This embodiment further includes a govenor controlled valve which functions in a manner similar to that of the above-described embodiment and a shuttle valve which provides an initial flow of compressed air to the pneumatic motor to assist start-up. Subsequent to start-up, the shuttle valve closes. Manual activation of the throttle valve provides compressed air to the motor and the piston of the throttle control assembly, maintaining it in an open or activated position. The device will remain activated until the tool completes the tightening of the fastener, stalls, and the flow of compressed air to the piston is interrupted, whereupon the throttle valve closes. This operating cycle ensures that, once commenced, the fastening operation will continue until the fastener is properly tightened, in spite of the fact that the operator may have removed activating force from the throttle valve stem. It should be noted, however, that the operator may terminate the operation of the pneumatic tool by the affirmative step of pulling the throttle valve stem and manually closing the valve.

It is thus the object of the instant invention to provide a pneumatic tool throttle control configuration which ensures accurate and complete assembly operations.

It is a further object of the instant invention to provide a pneumatic tool control configuration wherein multiple, fixtured tools will accurately and uniformly complete assembly operations.

It is a still further object of the instant invention to provide a pneumatic tool throttle control configuration wherein each tool may independently tighten a fastener to the proper torque and stall.

It is a still further object of the instant invention to provide a pneumatic tool throttle control configuration for a multiple tool installation which maintains the supply of compressed air until all fasteners have been properly tightened.

It is a still further object of the instant invention to provide a pneumatic tool throttle control which ensures that the tightening operation of either a single or multiple tool fixture will continue through to its completion.

Further objects and advantages of the instant invention will be apparent by reference to the following description and attached drawings.

BRIEF DESCRIPTION OF THE DRAWINGS

FIG. 3 is a fragmentary sectional, side elevational view of a pneumatic tool incorporating the instant invention and intended for multiple use in fixtures;

FIG. 4 is a fragmentary sectional, top plan view of a pneumatic tool incorporating an alternate embodiment of the instant invention taken along line 4—4 of FIG. 5; and FIG. 5 is a fragmentary, sectional, side view of a pneumatic tool incorporating an alternate embodiment of the instant invention;

DESCRIPTION OF THE PREFERRED EMBODIMENT

Figure 1:
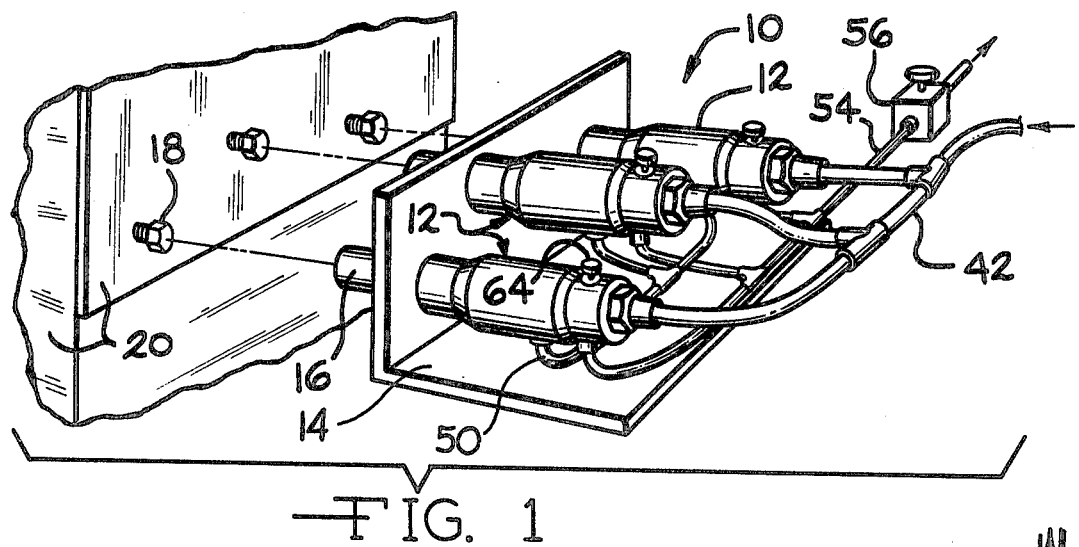
FIG. 1 is a perspective view of multiple pneumatic tools in a typical production line fixture and a fastener array on a product.

Referring now to FIG. 1, a multiple, fixtured pneumatic tool assembly is generally designated by the reference numeral 10. The pneumatic tool assembly 10 includes a plurality of pneumatic tools 12 which are disposed in an array and secured in a suitable support or fixture 14 by appropriate fastener means (not illustrated). Each of the tools 12 includes a fastener engaging member such as a socket 16 which engages a respective one of a plurality of fasteners 18. The fasteners 18 are utilized for example, to secure various structural members 20 to one another. For reasons of simplicity and clarity, only three of the tools 12 have been illustrated in FIG. 1. The number of the tools 12 and their general arrangement should be considered to be exemplary and illustrative only and it should be understood that both the number and arrangement of the tools 12 may vary widely and will ultimately be determined by the specific application.

Figure 2:
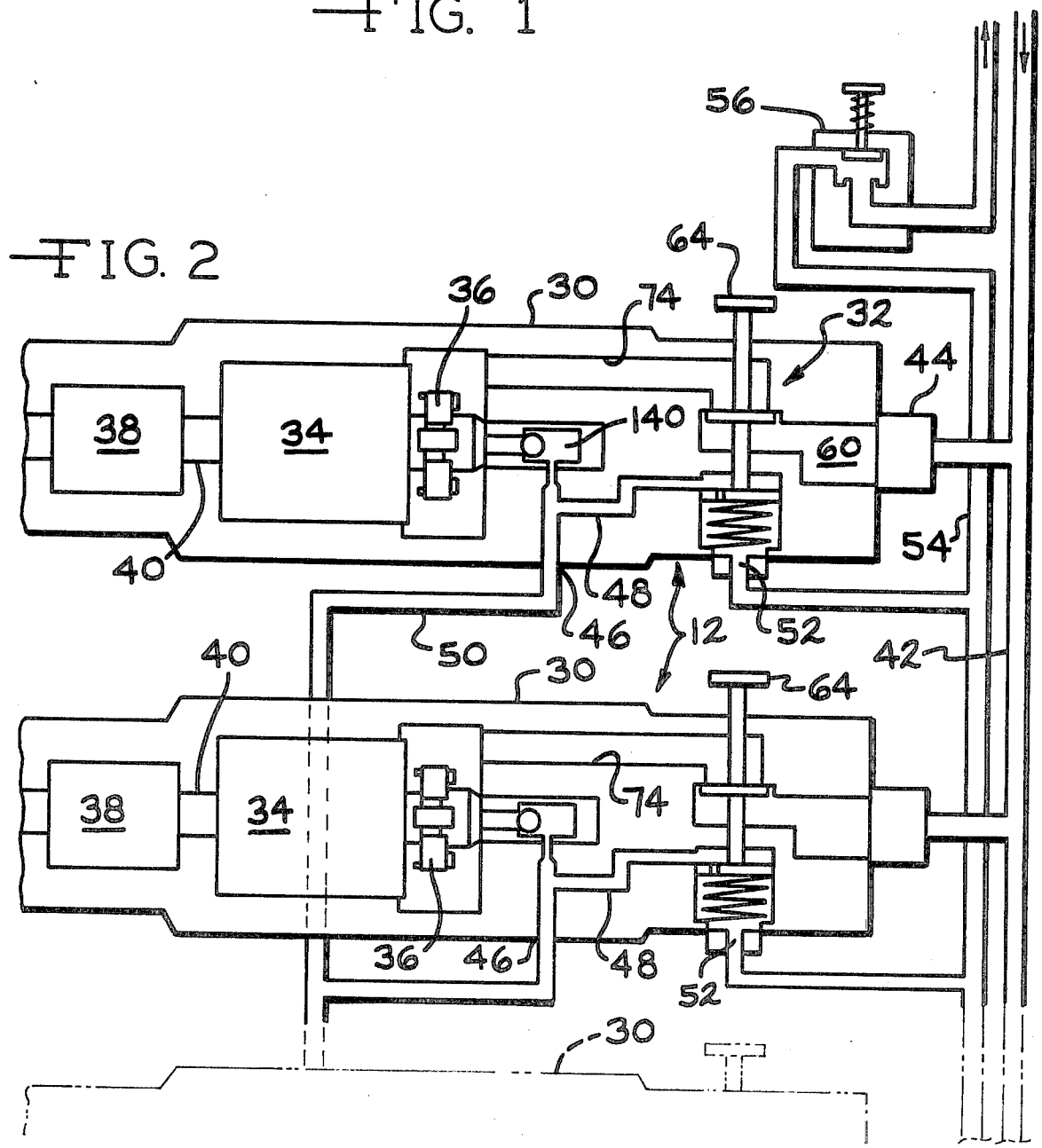
FIG. 2 is a diagrammatic view of multiple, fixtured pneumatic tools incorporating the instant invention in a typical installation.

Referring now to FIGS. 1 and 2, each of the tools 12 includes a generally elongate housing 30. Disposed within the elongate housing 30 is a throttle control assembly 32 and a conventional vane motor 34 having a shutoff governor assembly 36 secured for rotation therewith at one end and a speed reducing gear mechanism 38 operably connected to an output shaft 40 disposed at the other end of the vane motor 34. Compressed air is supplied to each of the tools 12 through a supply line 42 which is selectively secured to each of the housings 30 of the tools 12 by an inlet fitting 44. Each of the housings 30 includes a control port 46 which communicates with a control passageway 48. A control line 50 interconnects the control ports 46 of each of the tools 12. The housings 30 of each of the tools 12 also define exhaust ports 52 which feed into and are interconnected by a common exhaust line 54. The exhaust line 54 communicates to the atmosphere through a normally open pneumatic valve 56. The pneumatic valve 56 which may either be a manual type, as illustrated, or a remotely operable electro-pneumatic type, selectively terminates the flow of air through the exhaust lines 54 to the atmosphere to provide a stop or abort function as will be more fully described subsequently.

Figures 3, 4, 5:
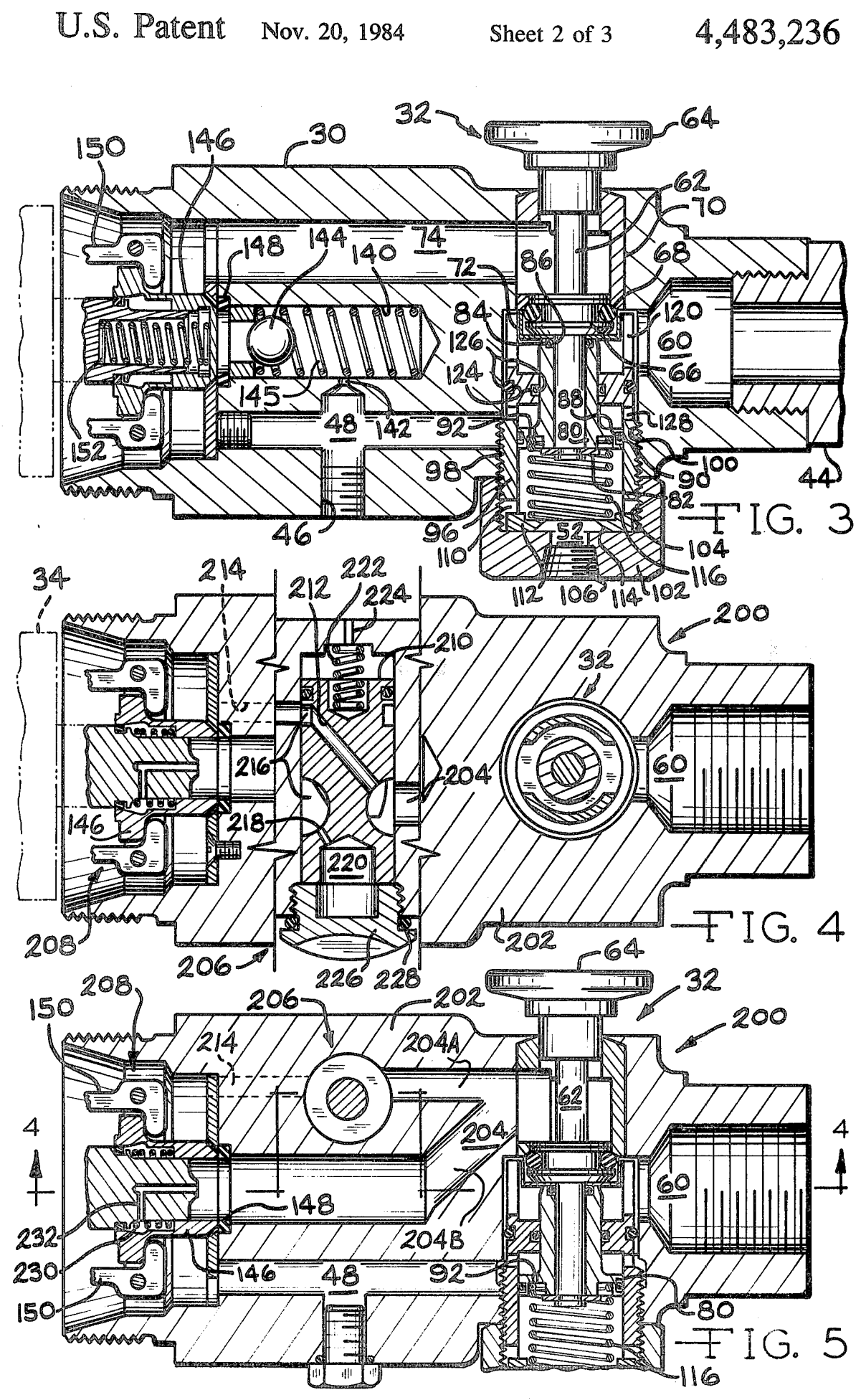

Referring now to FIG. 3, the inlet fitting 44 secures the air supply line 42 within an inlet passageway 60 which communicates with the throttle control assembly 32. The throttle control assembly 32 is disposed generally transversely within the housing 30 of the tool 12 and includes a centrally disposed valve stem 62. A control button 64 is secured to one end of the valve stem 62, and sealingly engages the housing 30, secured to the valve stem 62 is a valve spool 66 which receives an elastomeric sealing member such as an O-ring seal 68. Concentrically aligned with and axially adjacent the O-ring seal 68 is a circular valve seat member 70. A shoulder washer 72 is positioned concentrically about the valve stem 62 in the valve spool 66 and is radially adjacent the O-ring 68. Activation, i.e., depression of the control button 64 drives the O-ring seal 68 off the valve seat member 70 and supplies compressed air from the passageway 60 into a passageway 74 and thence into the pneumatic vane motor 34.

The throttle control assembly 32 also includes a piston 80 which is concentrically disposed upon the valve stem 62 and secured there by a suitable fastener such as a retaining ring 82. The piston 80 defines a first annular seal cavity 84 adjacent the valve stem 62 within which an O-ring seal 86 is positioned and a second annular seal cavity 88 disposed about the periphery of the piston 80 within which a second O-ring seal 90 is positioned. The piston 80 also includes a bleed port 92 which provides communication between the opposite faces thereof. The diameter of the bleed port 92 is preferably about 0.031 inches. Considerations affecting the choice of size of the bleed port 92 are discussed subsequently. Concentrically disposed about the piston 80 is a cylindrical member 96. The cylindrical member 96 is secured within the housing 30 of the tool 12 by complimentary male threads 98 and female threads 100 disposed on the mating surfaces of the cylindrical member 96 and the housing 30, respectively. A locking adjustment cap 102 likewise includes female threads 104 which also engage the male threads 98 on the cylindrical member 96. The locking cap 102 defines the exhaust port 52 and preferably includes female threads 106 which facilitate securement of the exhaust lines 54 to the tool 12. The end of the cylindrical member 96 most proximate the locking cap 102 defines a radially extending slot 110 within which is disposed a bar member 112. The bar member 112 defines an elongate through slot or keyway 114 and serves several functions. First of all, the bar member 112 functions as a retainer for a compression spring 116 coaxially aligned with the valve stem 62 and disposed between one surface of the piston 80 and the bar member 112. Secondly, the keyway 114 functions as a passageway to permit air flowing through the port 92 to exit the tool through the exhaust port 52. Thirdly, since the keyway 114 may be reached through the exhaust port 52 by a tool such as a screwdriver, the keyway 114 and the bar member 112 generally provides a means for adjusting the rotational position of the cylindrical member 96 relative to the housing 30. Such adjustment is significant for, at the end of the cylindrical member 96 adjacent the inlet passageway 60 and the valve spool 66, is a second radially extending slot 120. The slots 110 and 120 are preferably radially aligned. Rotation of the cylindrical member 96 within the housing 30 permits control of the air flow by opening or choking off the passageway defined by the radial slot 120 by aligning or misaligning the slot 120 with the inlet passageway 60. Since the slots 110 and 120 and thus the keyway 114 are in radial alignment, the angular position of the radial slots 120 relative to the inlet passageway 60 can be readily determined by observing the position of the keyway 114 through the exhaust port 52.

The cylindrical member 96 also defines a pair of annular grooves 124 which receive a respective pair of elastomeric members such as O-ring seals 126. The O-ring seals 126 maintain independent flow in the inlet passageway 60 and the control passageway 48. Finally, the cylindrical member 96 defines a plurality of radially oriented passageways 128 which provide communication between the control passageway 48 and the face of the piston 80 opposite the compression spring 116.

The control passageway 48 communicates with a centrally disposed chamber 140 through a restricting orifice 142. The diameter of the orifice is preferably about 0.0625 inches but may be substantially larger or smaller depending upon such parameters as the operating air pressure and air flow necessary to activate the throttle control assembly 32. Disposed within the central chamber 140 is a ball check 144 as well as a structure such as a helical spring 145 which ensures proper operation of the ball check 144. Coaxially aligned with and selectively controlling the passage of air through the central chamber 140 is a valve member 146 which is a component of the shutoff governor assembly 36. The valve member 146 seats against an elastomeric annular seal such as an O-ring seal 148. As stated previously, the shutoff governor assembly 36 is secured to and rotates with the rotor of the vane motor 34. The governor assembly 36 includes a plurality of flyweights 150 and a centrally disposed compression spring 152. When the vane motor 34 and thus the governor assembly 36 is rotating at or above a given threshold speed, the forces exerted by the flyweights 150 and transferred to the valve member 146 overcome the force of the compression spring 152 and the valve member 146 moves away from the O-ring seal 148 allowing air from the passageway 74 to enter the central chamber 140 and the control passageway 48. A more extensive description of the structure and operation of the shutoff governor assembly 36 may be found in U.S. Pat. No. 3,904,305 which is hereby incorporated by reference.

Referring now to FIGS. 2 and 3, the operation of the preferred embodiment of the instant invention will be described. Subsequent to positioning of the fixture 14 and tools 12 to perform a fastening operation or other production step, the control button 64 on any one of the tools 12 is depressed. In this position, compressed air moves from the inlet passageway 60 through the passageway 74 to the vane motor 34 and the vane motor 34 commences rotation. When the speed of rotation of the vane motor 34 exceeds a given threshold value, the govenor assembly 36 moves the valve member 146 off the O-ring seal 148 and compressed air enters the central chamber 140 and thence the control passageway 48. In the control passageway 48, the flow of compressed air bifurcates and a portion travels into the throttle control assembly 32 where it exerts a force against the piston 80 which overcomes the force of the compression spring 116 and maintains the throttle control assembly 32 and specifically the valve stem 62 in the depressed or activated position. It should be noted that the bleed port 92 continually bleeds a small, fixed flow of air out the exhaust port 52, through the exhaust lines 54 and the valve 56, into the atmosphere. The bifurcated flow of air through the control passageway 48 also provides a flow of air out the control port 46 and into the control line 50 from whence it passes to the control ports 46 of all the interconnected tools 12 disposed on the fixture 14. As control air enters the control passageway 48 of another of the tools 12 on the fixture 14, a portion of the air flow enters the central chamber 140 and moves the ball check 144 to the left, inhibiting any air flow to the vane motor 34 from the chamber 140. Control air is also supplied to the piston 80 and the force exerted by the air against the piston 80 activates the throttle control assemblies 32 of this and all other interconnected tools 12 disposed on the fixture 14. Compressed air is thus supplied from the inlet passageways 60 through the throttle control assemblies 32, the passageways 74 and into the vane motors 34 of all of the tools 12.

The tools 12 will then independently operate until each tightens down a fastener 18 or completes its assigned assembly step and then stalls. As each of the tools 12 stalls, its respective shutoff governor assembly 36 will return to the position illustrated in FIG. 3 and terminate one of the supplies of compressed air to the control line 50. It should be apparent that as long as any one of the tools 12 is still operating, there, in fact, will be a supply of compressed air into the control line 50 which will maintain all of the throttle control assemblies 32 in the depressed or activated condition. In this condition, should one or more of the fasteners 18 (which had apparently been properly tightened as indicated by the stall of the associated tool) suddenly loosen due to the subsequent tightening of other of the fasteners 18, compressed air is still available to the vane motors 34 of the tools 12 in order to complete the tightening or fastening operation of a loosened fastener 18 or other device. When the last one of the tools 12 in a given fixture 14 stalls, the flow of air into the control line 50 will be terminated by its shutoff governor assembly 36. At this time, the controlled bleed through the bleed ports 92 will relatively rapidly dissipate the pressure within the control line 50 and the compression springs 116 of each of the throttle control assemblies 32 will drive these assemblies to their deactivated or closed positions, terminating the flow of compressed air to the associated vane motors 34.

Prior to the completion of the operating cycle discussed above, the pneumatic valve 56 may be utilized to interrupt or abort the operating cycle of all of the tools 12 prior to its completion as discussed above. As noted, the bleed ports 92 of each of the tools 12 continually bleed a small quantity of air into the exhaust line 54 while the tools 12 are operating. If it is necessary to terminate the operating cycle prior to its completion, the valve 56 is closed and the flow of air through the exhaust line 54 and into the atmosphere ceases. In this condition, air pressure within the exhaust line 54 will increase, equalizing the air pressure on the opposed faces of the pistons 80 within each of the throttle control assemblies 32. The force of the compression springs 116 will then close each of the throttle control assemblies 32 and the entire complement of the tools 12 on a given fixture 14 will terminate their operation.

A major parameter which controls the speed at which the tool 12 and more specifically the throttle control assemblies 32 de-activate at the end of an operating cycle or upon an abort command from the valve 56, is the diameter of the bleed port 92. A larger diameter bleed port 92 minimizes de-activation time by rapidly bleeding off the air within the control passageway 48 and the control line 50 during a cycle termination step or permitting rapid equalizing of the pressure on opposite sides of the piston 80 during an abort sequence. However, enlarging the diameter of the bleed ports 92 increases the air flow therethrough and thus the consumption of air by the tools 12. An appropriate compromise has been found to be a port diameter of 0.031 inches. Larger and smaller diameters of the ports 92 may, of course, be utilized with the corresponding effect upon shutoff speed and air consumption discussed above. Furthermore, it should be noted that a suitable bleed rate may be achieved by sizing the piston 80 to fit loosely within the cylindrical member 96 thereby providing a bleed path about the periphery of the piston 80. In this case, the bleed port 92 may, of course, be eliminated.

Figure 6:
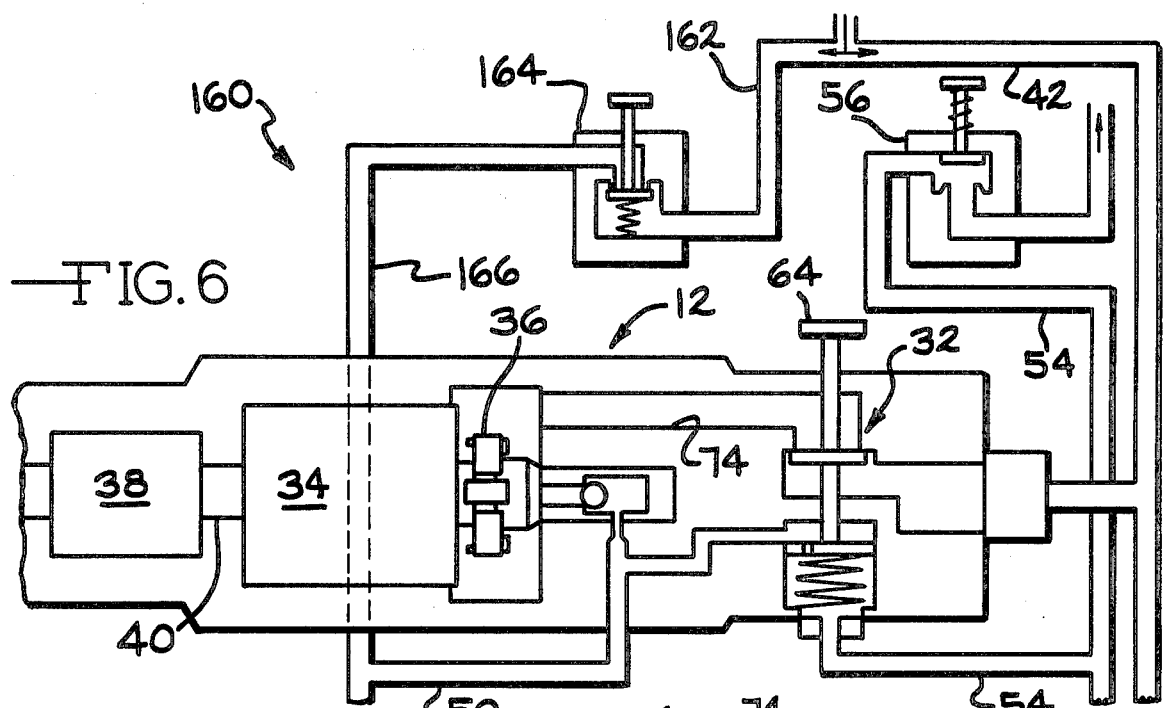
FIG. 6 is a diagrammatic view of a pneumatic tool utilizing a first alternate embodiment control configuration according to the instant invention.

Referring now to FIG. 6, a first alternate embodiment control configuration 160 is illustrated. The control configuration 160 includes a plurality of the tools 12 having components such as a throttle control assembly 32, the vane motor 34, the shutoff governor assembly 36, the compressed air supply line 42, the control line 50, and the exhaust line 54 identical in structure and function to those components of the preferred embodiment discussed above. Although only a single tool 12 is illustrated in FIG. 6, it should be understood that additional tools 12 may, and generally will be, utilized. Such additional tools 12 are connected to the supply line 42, the control line 50 and the exhaust line 54 as illustrated. The tools 12 may be activated by depressing any one of the control buttons 64. The operating cycle will cease when the last of the tools 12 has completed its operation or the operating cycle of all of the tools 12 may be aborted by activation of the pneumatic valve 56. All of these operating sequences are identical to those discussed above in connection with the preferred embodiment. In addition to the components of the preferred embodiment, the first alternate embodiment 160 includes a supply line 162 which communicates between the supply line 42 which provides compressed air to the tools 12 and a normally closed pneumatic valve 164. Like the pneumatic valve 56, the pneumatic valve 164 may be manually activated, electrically activated or activated by some other means. The pneumatic valve 164 controls the flow of compressed air from the line 162 into a line 166 which communicates with the control line 50. The pneumatic valve 164 thus controls and provides a flow of compressed air in a relatively direct fashion to all of the pistons 80 of the throttle control assemblies 32 of the tools 12 in order to activate them. A significant advantage of a first alternate embodiment control configuration 160 is that the pneumatic valve 164 may be positioned at a location remote from the tools 12, as may the pneumatic valve 56, in order to provide remote activation and de-activation of the tools 12.

Figure 7:
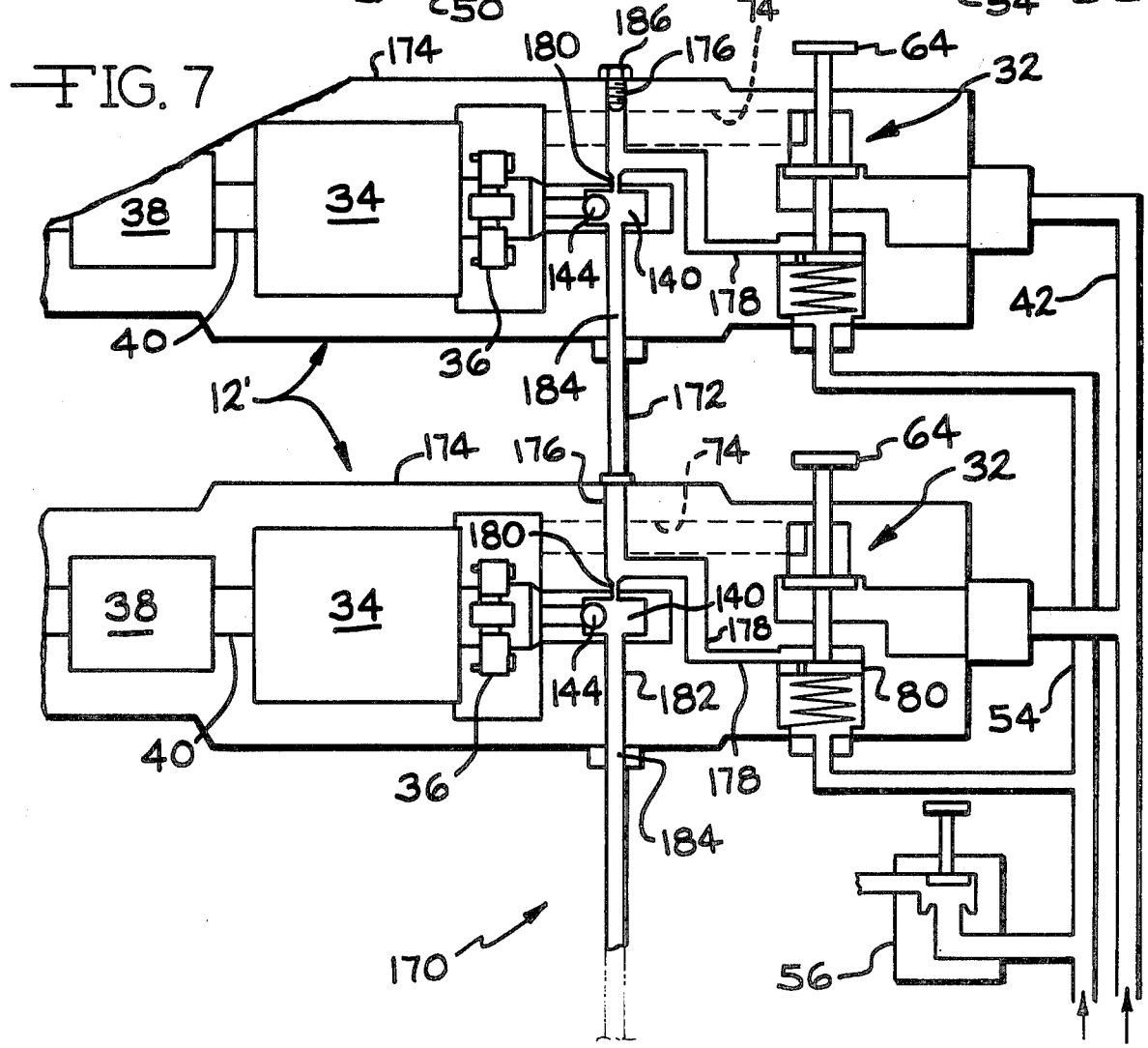
FIG. 7 is a diagrammatic view of multiple pneumatic tools incorporating a second alternate embodiment control configuration according to the instant invention.

Referring now to FIG. 7, a second alternate embodiment control configuration 170 is illustrated. The second alternate embodiment control configuration 170 provides particular advantage in installations where the number of tools installed in a fixture and operated together is substantial. The tool 12' incorporates or includes the throttle control assembly 32, the vane motor 34, the shutoff governor assembly 36, the supply line 42 and the exhaust line 54. In distinction to the preferred embodiment configuration, a control line 172 interconnects the tools 12' in a series-type configuration. Each of the tools 12' differs from the tools 12 of the preferred embodiment in that a housing 174 defines an inlet port 176 which is in direct, unrestricted communication with the piston 80 of the throttle control assembly 32 through a passageway 178. An orifice 180 having a diameter of approximately 0.0625 inches provides a restriction between the passageway 178 and the chamber 140 within which is disposed the ball check 144. The housing 174 also defines a passageway 182 which communicates between the chamber 140 and an outlet port 184. From the outlet port 184 of one of the tools 12', the control line 172 communicates with the inlet port 176 of an adjacent one of the tools 12' as illustrated in FIG. 7. The inlet port 176 of what may be characterized the first tool of the series-type configuration is sealed by a threaded plug 186 as is the outlet port 184 of the last of the tools 12'. In this configuration, the orifices 182 provides a restriction to the flow of compressed air through the tools 12', i.e., from the inlet port 176 to the outlet port 184 and thus tend to divert air and ensure a pressure rise in the passageway 178 and against the face of the piston 80. The establishment of pressure against the piston 80 opens the throttle control assembly 32 and energizes each of the tools 12'. In this second alternate embodiment control configuration 170, the tools 12' activate in sequential fashion since the restriction 182 causes a pressure increase in the passageway 178 and against the face of the piston in the first tool 12', then in the second and so on. Connected in this configuration, the number of the tools 12' which may be utilized on a common fixture or generally together in an array may be increased almost without limit.

It should be apparent that the pneumatic valve 56 will function in the second alternate embodiment control configuration 170 in the same manner and provide the same shutoff or abort capability as the pneumatic valve 56 in the first alternate embodiment control configuration 160 and the preferred embodiment of the pneumatic tool assembly 10. Furthermore, it should be noted that the pneumatic valve 164 illustrated in FIG. 6 in connection with the first alternate embodiment control configuration 160 may be readily adapted to the second alternate embodiment control configuration 170 illustrated in FIG. 7 to remotely initiate operation. In this regard, the normally closed pneumatic valve 164 is connected from the supply line 42 to the inlet port 176 of the first of the tools 12', the inlet port plug 186 having been removed. Activation of the pneumatic valve 164 thus provides air to the first of the tools 12' and sequentially commences operation of all of the tools 12' interconnected by the control line 172.

Referring now to FIGS. 4 and 5, an alternate embodiment pneumatic tool 200 is illustrated. The pneumatic tool 200 is intended for use singly, as a hand-held tool. The tool 200 includes a housing 202 which is distinct from the housing 30 of the preferred embodiment of the tool 12 and provides secure mounting for components such as the throttle control assembly 32, a vane motor 34 and the speed reducing gear mechanism (not illustrated) which are identical to those components of the preferred embodiment tool 12. The housing 202 defines an inlet passageway 60 which communicates with the throttle control assembly 32. The throttle control assembly 32 is disposed generally transversely in the housing 202 and includes those components previously delineated in the instant specification. Reference thereto is suggested.

The valve portion of the throttle control assembly 32 selectively provides communication and flow of compressed air from the inlet passageway 60 to a bifurcated passageway 204. One branch 204A of the passageway 204 leads to a shuttle valve assembly 206 and the other branch 204B of the passageway leads directly to a shutoff governor assembly 208. The shuttle valve assembly 206 includes a shuttle body 210 defining an oblique passageway 212 which communicates between the passageway 204A and an axial passageway 214 when the shuttle body 210 is in the position illustrated in FIG. 4. At each end of the oblique passageway 212 are disposed circumferential channels 216 which maintain proper operation of the shuttle valve assembly 206 regardless of the rotational position of the shuttle body 210. The shuttle body 210 also defines a second oblique passageway 218 which leads from the centrally disposed circumferential channel 216 to a chamber 220. A compression spring 222 biases the shuttle body 210 to the position illustrated in FIG. 4. A vent port 224 maintains the region within which the compression spring 222 is disposed at atmospheric pressure. A threaded plug 226 having an appropriate O-ring seal 228 removably retains the shuttle body 210 within the housing 202 of the tool 200.

The shutoff governor assembly 208 is secured for rotation to the vane motor 34 of the tool 200 in a manner identical to that of the preferred embodiment of the tool 12. The shutoff governor assembly 208 includes a plurality of pivotally disposed flyweights 150 which contact a cylindrical valve member 146. A compression spring 230 disposed within the valve member 146 biases the valve member 146 towards the O-ring seal 148 which serves as a valve seat.

The cooperative operation of the shuttle valve assembly 206 and the shutoff governor assembly 208 is fully described in the previously referenced U.S. Pat. No. 3,904,305 but will be briefly reviewed here in the context of the overall operation of the tool 200. To commence operation of the tool 200, the button 64 is manually depressed allowing compressed air to pass from the inlet passageway 60 to the bifurcated passageway 204. At this time, the shuttle body 210 of the shuttle valve assembly 206 and the valve member 146 of the shutoff governor assembly 208 are in the positions illustrated in FIG. 4. Thus air may travel to the vane motor 34 through the oblique passageway 212 in the shuttle body 210 and thence to the passageway 214 but no air may enter the motor through the valve defined by the valve member 146 and O-ring seal 148 of the shutoff governor assembly 208. A portion of the air delivered to the vane motor 34 enters the control passageway 48, exerts pressure against the upper face of the piston 80 and maintains the throttle control assembly 32 in an open position. As the tool 200 begins to operate, the flyweights 150 move the valve member 146 axially to the left as viewed in FIGS. 4 and 5 which permits air to pass through the passageway 204 and into the vane motor 34. At approximately the same time, pressure increases within the chamber 220 of the shuttle body 210 driving it upwardly against the force of the compression spring 222, terminating the flow of air through the oblique passageway 212 and the axial passageway 214. The tool 200 then continues to operate in a conventional fashion until the tool stalls and the shutoff governor assembly 208 terminates the flow of air to the vane motor 34. At this time, the flow of compressed air to the piston 80 is likewise terminated, the bleed port 92 exhausts air to the atmosphere and the compression spring 116 returns the throttle control assembly 32 to its de-activated position, terminating the flow of compressed air from the inlet passageway 60 to the bifurcated passageway 204.

The significant feature of this alternate embodiment tool 200 is that once the control button 64 has been activated, the tool 200 will complete its cycle of operation without further attention, i.e., manual maintenance of the control button 64 in the activated position by the operator. In this regard, it should be noted that the operator, however, may terminate an operating cycle prior to its completion by simply manually lifting the control button 64 and terminating the supply of compressed air into the tool 200.

For reasons of clarity and simplicity, the foregoing disclosure directed to pneumatic throttle controls has utilized tools 12 which will generally be recognized by those skilled in the art to be nutrunners which conventionally are utilized to secure threaded fasteners, as noted. Notwithstanding such descriptive examples, it should be understood that the throttle invention disclosed herein is wholly useable with and confers equivalent benefits upon all types of pneumatic tools which perform various assembly and fabrication operations.

The foregoing disclosure is the best mode devised by the inventor for practicing this invention. It is apparent, however, that devices incorporating modifications and variations to one skilled in the art of pneumatic tools. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. In a pneumatic tool having a housing and a pneumatic motor, the improvement comprising a first valve means having an open position and a closed position for supplying compressed air to said pneumatic motor in said open position, biasing means urging said first valve means to the closed position, piston means secured to a common member with said first valve means for common movement therewith, said piston means selectively maintaining said first valve means in an open position, second valve means having closed and open positions for supplying compressed air to said piston means when in open position and means for sensing the speed of rotation of said pneumatic motor to open said second valve means when such speed exceeds a minimum value thereby to supply compressed air to said piston means to maintain the piston means and first valve means connected thereto in a piston position corresponding to the open position of the first valve means with the compressed air on the piston means when the second valve means is open providing sufficient force to overcome the biasing means acting in an opposite direction, and restriction means for adjusting the flow of compressed air to said pneumatic motor, said restriction means including a cylindrical chamber defined by said housing having at least one first aperture in the sidewall of said chamber and a cylindrical member disposed within said chamber, said member defining at least one second aperture and having indicator means associated therewith and visible external to said housing for indicating the angular position of said second aperture whereby said first and second apertures may be selectively aligned to adjust the flow of compressed air to said motor.

2. The improvement of claim 1 wherein said piston means includes a bleed port communicating between opposed faces of said piston means.

3. The improvement of claim 1 wherein said common member includes a control means for manually activating said common member to overcome the biasing means and supply compressed air to the motor.

4. The improvement of claim 1 including a first passageway communicating between said first valve means and said motor and a second passageway communicating between said second valve means and said piston means, and means for exhausting air from said second passageway to the atmosphere.

5. The improvement of claim 4 further including manually engageable means for translating said first valve means and said piston means between said first and second positions.

6. The improvement of claim 4 further including a shuttle valve disposed in said first passageway and movable between a first flow establishing position and a second flow interrupting position, a third passageway communicating between said first valve means and said motor, a control valve positioned in said third passageway between said first valve means and said motor, means for sensing the speed of said motor and opening said control valve in response to such sensed speed.

7. The improvement of claim 6 further including means associated with said piston means for exhausting air from said second passageway to the atmosphere.

8. The improvement of claim 7 wherein said exhausting means is an orifice defined by said piston means.

9. The improvement of claim 4 further including a check means disposed in said second passageway for inhibiting flow of compressed air from said piston means toward said second valve means.

10. The improvement of claim 9 further including a control port providing communication with said second passageway between said check means and said piston means.

11. The improvement of claim 9 further including a plurality of pneumatic tools, each of said tools further including a control port communicating with the second passageway of each of said tools and a control line interconnecting said control ports of said plurality of pneumatic tools.

12. The improvement of claim 11 further including means for selectively providing compressed air to said control line interconnecting said control ports.

13. The improvement of claim 11, further including an inlet port in communication with said second passageway, a flow restriction in said second passageway between said inlet port and said second valve means and an outlet port in communication with said second passageway between said second valve means and said restriction.

14. The improvement of claim 13 further including means for sealing said inlet port of a first of said tools and said outlet port of a last of said tools and means for serially interconnecting the remaining said inlet ports with remaining said outlet ports.

15. The improvement of claim 4 or claim 9 further including an exhaust line interconnecting said exhausting means and means for selectively interrupting the flow of such exhaust air to the atmosphere.

* * * * *